Patented July 17, 1923.

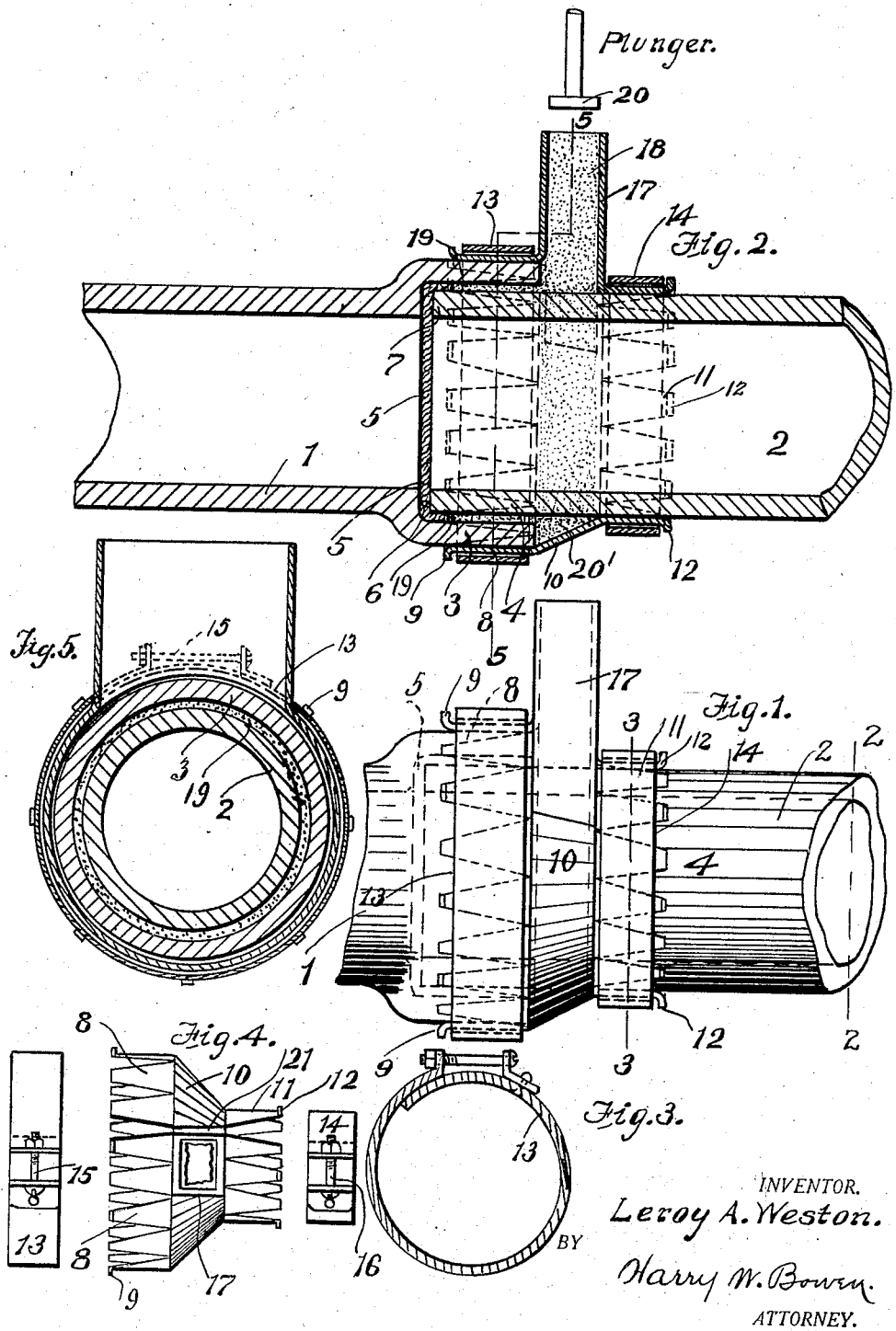

1,462,077

UNITED STATES PATENT OFFICE.

LEROY A. WESTON, OF ADAMS, MASSACHUSETTS.

APPARATUS FOR FORMING PIPE JOINTS.

Application filed November 23, 1922. Serial No. 602,781.

*To all whom it may concern:*

Be it known that I, LEROY A. WESTON, a citizen of the United States of America, residing at Adams, county of Berkshire, State of Massachusetts, have invented certain new and useful Improvements in Apparatus for Forming Pipe Joints, of which the following is the specification.

This invention relates to improvements in joint forming devices for forming water and gas tight joints between the bell shaped and the spigot end of adjacent pipes, as sewer and gas pipes.

An object of the present invention is to provide efficient means for effectually introducing and retaining in place the cement, or concrete, when in a semi-liquid form in the annular space between the inner surface of the bell shaped and spigot end of a pipe joint so that there is no possibility of a defective or leaky joint after its completion.

A further object is to provide a joint forming device which can be readily and permanently attached to the meeting ends of the two adjacent pipe sections before the cement is introduced.

A further object is to provide such a device with flexible finger like elements or portions which will conform to the external shape or contour of the adjacent pipe sections when a suitable clamping device as a band is tightened about or around said elements as will be fully described.

I am aware that devices for forming pipe joints are in use for the purpose of retaining the cement or concrete in place when in a semi liquid state in the annular space in the bell and about the end of the bell and around the spigot end of the pipe.

The present invention is in the nature of an improvement over the construction shown described and claimed in my three prior Patents Number 1,163,726 dated December 14, 1915 Number 1,174,209 dated March 7, 1916 and Number 1,237,003 dated August 14, 1917.

Referring to the accompanying drawings:

Fig. 1 is an external view of the meeting ends of two pipe sections showing the device clamped in place and ready for the introduction of the cement.

Fig. 2 is a vertical sectional view on a plane indicated by the line 2—2 of Fig. 1 and passing through the axis of the pipe sections.

Fig. 3 is a sectional view of one of the tightening and clamping bands.

Fig. 4 is a view of the device removed from the pipes, and

Fig. 5 is a sectional view on line 5—5 of Fig. 1.

Referring to the drawings in detail:

1 and 2 designate the two adjacent pipe sections, in place ready for the insertion of the cement, 3 the bell portion and 4 the spigot portion. 5 designates the usual hemp or other rope packing which is inserted on the annular shoulder at 6 of the bell portion and against which the inner end 7 of the spigot portion bears. 8 designates a plurality of integral and flexible finger-like portions or elements having upturned end portions 9. These finger like portions or elements are integral with or attached to and form a part of the main or inclined funnel shaped part 10 and integrally attached to this part are the integral and flexible finger like elements 11 which are also formed with the upturned ends 12. The fingers 8 are slipped on to the outer surface of the bell 3 as shown in Figs. 1 and 2. The spigot end 4 is then slipped into the finger like elements 11 and against the rope packing 5. In order to retain the device as a whole firmly in place on the sections, two constructing bands 13 and 14 are provided. These bands are formed with tightening devices indicated by the bolts 15 and 16. The band 13 is let out or enlarged so that it will freely pass over the upturned portions 9. The nut on the bolt 15 is then tightened causing the band to tightly grip and force the finger like elements 8 into close contact with the bell 3. The band 14 is now slipped over the other finger elements 11 and the nut on the bolt 16 is tightened to draw the fingers 11 tightly against the spigot end of the pipe 2.

This construction forms practically a cement tight joint between the fingers and the pipes. The base portions of the fingers, as shown are close together thereby preventing the escape of any cement. Formed as a part of or attached to the part 10 is an upwardly extending chute member 17 for introducing or inserting the cement or other joint forming material indicated at 18. The cement flows into the annular space 19 between the inner surface of the bell and the outer surface of the spigot end of the pipe 2 as indicated. If necessary, a plunger device 20 may be inserted into the part 17 causing the cement to be forced into the annular space for completely filling the same and particularly into the bottom part of the bell. This device also provides means for forming an annular ring member of cement at the outer end of the bell indicated at 20'. The flexibility of the fingers 8 and 11 permits these elements to closely conform to any irregularities in the surface of the pipe, as oftentimes, a sewer pipe is not a true circle.

A detail of each of the bands 13 and 14 is shown in Fig. 3. It will be noticed that the member 10 is slitted or cut at 21 so that its ends can be separated to permit the device to be opened and slipped over the end of the bell end. When the bands 13 and 14 are tightened the meeting edges of the opening 21 will slip past each other and form a closed or tight joint. If desired, the bands 13 and 14 may be attached or riveted to the fingers 8 to prevent loss. The device is designed to be permanently attached to the pipe sections so that as the cement hardens it will form a permanent joint.

What I claim is:

1. In a device for the purpose described, the combination with the spigot and bell ends of two adjacent sections of pipe, said device having two sets of flexible finger like elements designed to engage the outer ends of the bell and spigot end respectively, said fingers having upturned portions, bands engaging the fingers, and retained in place by the upturned portions, means for tightening the bands to draw the fingers against the pipe sections, said device having an upwardly extending member for introducing the joint forming material, as semi-liquid cement into the annular space between the sections.

2. A device for attachment to and for surrounding the bell and spigot ends of adjacent pipe sections, said device comprising a band like member having oppositely extending finger portions, means for drawing said portions firmly against the pipe sections, means for preventing the drawing means from becoming displaced from their engagement with the portions, and means for inserting the joint forming material into the interior of the device.

3. A device for the purpose described comprising a one piece member which is formed with oppositely extending integral finger like portions, said device being slitted to permit it to be applied around the joint of two assembled pipe sections, means for clamping the device permanently to the adjacent ends of the pipe sections including constricting bands engaging the finger like portions, means for introducing the joint forming material into the device comprising a funnel member located intermediate of the finger like elements.

4. In a pipe joint forming device a member for encircling the adjacent ends of pipe sections, said member having two series of flexible finger like portions for engaging said pipe ends, detachable means engaging said portions for drawing them against the pipe ends, said device having a chute portion for inserting the joint forming material into the space about the pipe ends.

5. A device for the purpose described comprising, in combination, a one piece substantially circular member of flexible material having on its opposite ends finger like portions to engage the bell and spigot ends of two pipe sections, separable bands for clamping the said portions to the pipe sections to prevent the escape of the joint forming material, the finger like portions having means for retaining the bands in place and the device having a chute for inserting the material into the device.

LEROY A. WESTON.